P. Fisher. Flesh Fork.
116291     PATENTED JUN 27 1871
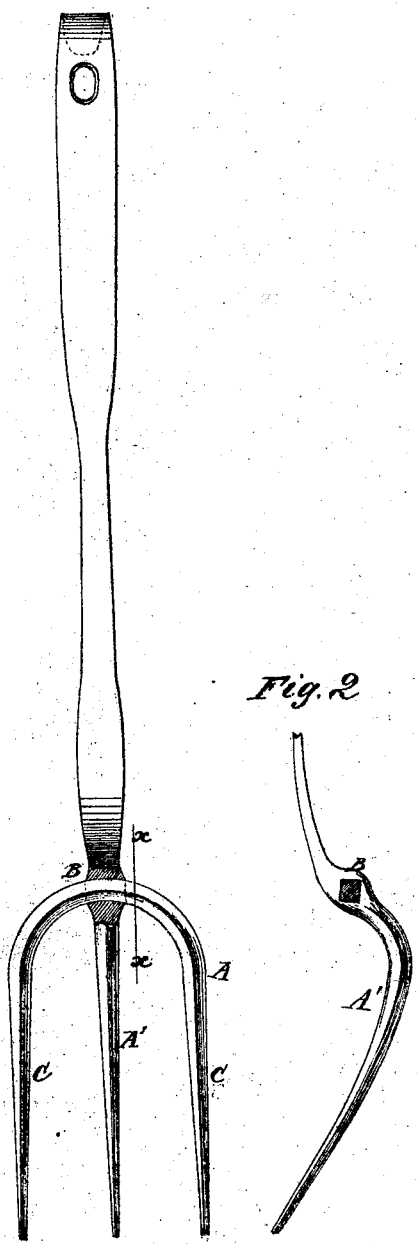
Witnesses:
A. W. Almqvist
Wm. H. C. Smith
Inventor:
P. Fisher.
per Munn & Co.
Attorneys.

UNITED STATES PATENT OFFICE.

PAUL FISHER, OF BROOKLYN, NEW YORK.

IMPROVEMENT IN FLESH-FORKS.

Specification forming part of Letters Patent No. 116,291, dated June 27, 1871.

*To all whom it may concern:*

Be it known that I, PAUL FISHER, of Brooklyn, in the county of Kings and State of New York, have invented a new and useful Improvement in Flesh-Forks; and I do hereby declare that the following is a full, clear, and exact description thereof, which will enable others skilled in the art to make and use the same, reference being had to the accompanying drawing forming part of this specification.

This invention relates to a new and useful improvement in the utensil known as a "flesh-fork;" and consists in the mode of attaching the two outer tines to the shank of the fork.

In the drawing, Figure 1 shows a front view of the fork. Fig. 2 is a section of the fork taken on the line $x$ $x$ of Fig. 1.

Similar letters of reference indicate corresponding parts.

A is a flesh-fork, constructed according to my invention. These forks are made with three tines, the middle tine, A', being an elongation of the shank of the handle. B is the shank. The two outer tines C C are made of a single piece, which passes through the shank, the ends being properly tapered and bent to correspond in form with the tine A'. As heretofore made, a round hole has been punched through the shank, and the piece forming the two outer tines is made to fit, being simply a piece of round iron or steel, of the required size, tapered and bent as before stated. The forks are made of iron or steel, or of both, and are tinned over to prevent oxidation. This thin coating of tin is all the fastening which the round iron has in the shank, or all that is depended upon to prevent the iron from turning in the hole. In lifting with the fork the tendency is to loosen this connection, as the strain at times is great, and the result is that after using such forks, and while the outer tines drop down, by reason of the loosened shank connection, the fork becomes worthless. To remedy this difficulty, I make a square hole through the shank and make the piece which forms the two outer tines square to fit it. I make the fork otherwise as it has heretofore been made, except that I upset or enlarge the shank around the hole to give additional strength where the strain is greatest.

By this improved mode of manufacture the fork is made strong and durable, and suited for army and navy as well as for household use.

Instead of making the hole through the shank square, as above stated, it is obvious that the same effect would be produced if the hole were made oval, or with angles, or in any form other than round. I do not, therefore, confine myself to the square form of hole, but design to use any form other than round, whereby the outer tines may be secured in place and prevented from turning, without tinning, soldering, or brazing.

Having thus described my invention, I claim as new and desire to secure by Letters Patent—

The tine C, square in cross-section, and fitting in a socket of the middle tine A', substantially as shown and described.

The above specification of my invention signed by me this 15th day of March, 1871.

PAUL FISHER.

Witnesses:
GEO. W. MABEE,
T. B. MOSHER.